(12) United States Patent
Landeis

(10) Patent No.: US 6,286,605 B1
(45) Date of Patent: Sep. 11, 2001

(54) CUTTING SYSTEM

(76) Inventor: Marvin Landeis, 2928 Orr Cir., Inkster, ND (US) 58244

( * ) Notice: Subject to any disclaimer, the term of this patent is extended or adjusted under 35 U.S.C. 154(b) by 0 days.

(21) Appl. No.: 09/415,904

(22) Filed: Oct. 8, 1999

(51) Int. Cl.[7] .................................................. A01D 55/18
(52) U.S. Cl. .............................................................. 171/50
(58) Field of Search ................................ 171/50, 42, 30, 171/DIG. 1; 56/235, 256, 504, 1, 2, 17.1, 255, 295, 327.1, 328.1, 121.4, DIG. 17, DIG. 20; 460/904

(56) References Cited

U.S. PATENT DOCUMENTS

| | | | |
|---|---|---|---|
| 1,321,782 | * | 11/1919 | Barrett ..................................... 171/40 |
| 1,573,364 | * | 3/1926 | Russell et al. ........................... 171/42 |
| 1,848,265 | * | 3/1932 | Moreau ................................... 171/112 |
| 1,872,639 | * | 8/1932 | Licht ....................................... 171/13 |
| 2,141,806 | * | 12/1938 | Zielesch ................................. 56/121.4 |
| 2,537,198 | * | 1/1951 | Wetzel et al. ............................. 171/5 |
| 2,539,881 | * | 1/1951 | Wilkins .................................. 56/121.4 |
| 2,562,387 | * | 7/1951 | Perry ....................................... 56/13.6 |
| 2,608,815 | * | 9/1952 | Graaff ..................................... 171/103 |
| 3,126,062 | * | 3/1964 | Schmidt ................................... 171/42 |
| 3,194,317 | * | 7/1965 | Vautinall .................................. 171/1 |
| 3,589,117 | * | 6/1971 | Wadsworth ............................. 56/247 |
| 3,756,322 | * | 9/1973 | Kopasz ..................................... 171/5 |
| 4,026,092 | * | 5/1977 | Wehde ................................... 56/14.3 |
| 5,737,908 | * | 4/1998 | Andelfinger ........................... 56/235 |
| 5,904,033 | * | 5/1999 | Landeis ................................... 56/235 |

* cited by examiner

Primary Examiner—Christopher J. Novosad
(74) Attorney, Agent, or Firm—Michael S. Neustel

(57) ABSTRACT

A vine cutter for cutting entangled vines of potato plants in front of a potato harvester so that the vines do not become entangled and accumulated upon a front portion of the potato harvester. The inventive device includes a frame having a pair of upper members and a pair of opposing lower members, a first disc and a second disc journaled to the frame, a third disc journaled to the frame below the first disc and second disc, a ground engaging rim attached coaxially to the third disc, and a motor mechanically connected to the first, second and third discs. The first disc, the second disc and the third disc are vertically orientated, and a portion of the discs overlap and are juxtaposed to one another. A portion of the third disc is between the first disc and the second disc for severing the vines. The discs preferably include a plurality of notches projecting into their respective outer perimeters. The discs may have different sizes with respect to one another. The ground engaging ring attached to the third disc determines the depth of penetration by the third disc into the ground. The discs preferably rotate opposite of one another with a lower portion of the third disc rotating with the movement of the frame with respect to the ground surface. In an alternative embodiment of the present invention, the first disc and the second disc are attached to the frame below the third disc thereby engaging the ground surface.

20 Claims, 6 Drawing Sheets

CUTTING SYSTEM

BACKGROUND OF THE INVENTION

1. Field of the Invention

The present invention relates generally to potato harvesting devices and more specifically it relates to a vine cutter for cutting entangled vines of potato plants in front of a potato harvester so that the vines do not become entangled and accumulated upon a front portion of the potato harvester.

A potato harvester typically harvests two rows of potatoes at a time. However, the vines from neighboring rows typically grow across the pair of rows being harvested causing them to become entangled about the side portions of the potato harvester. The entangled vines then uproot the attached tubers where after the tubers are damaged by sunlight. Further, the entangled vines accumulate on the side portions of the potato harvester requiring the operator to stop the potato harvester for cleaning the accumulated vines away. The sun damaged tubers have to be separated from the undamaged tubers and are unrecoverable into a viable product. It is therefore necessary that the vines surrounding the harvested pair of rows be cut from the vines of adjacent rows before the tubers can be properly dug by the potato harvester.

Conventional vine cutters comprise a single disc attached to the potato harvester which rotates with the movement of the potato harvester. The penetration of the disc in combination with the rotating cuts the vines. However, when the vines are wet or green, the vines are simply pressed deep into the ground and not cut. The vines then become entangled within the potato harvester. Also, the conventional vine cutters used today create a narrow channel in front of the potato harvester defining a side wall of dirt. When the digger portion of the potato harvester penetrates the ground to remove the potatoes, the side wall of dirt allows chunks of dirt to remain instead of being broken up. These chunks of dirt engage the tubers thereby causing damage to them. Also the chunks of dirt with the harvested tubers store moisture which causes rotting of the tubers during storage.

2. Description of the Prior Art

There are numerous potato harvesting devices. For example, U.S. Pat. No. 5,904,033 to Landeis; U.S. Pat. No. 2,562,387 to Perry; U.S. Pat. No. 3,126,062 to Schmidt; U.S. Pat. No. 2,537,198 to Wetzel et al.; U.S. Pat. No. 4,026,092 to Wehde; U.S. Pat. No. 3,756,322 to Kopasz; U.S. Pat. No. 2,608,815 to Graaff; U.S. Pat. No. 1,321,782 to Barrett; U.S. Pat. No. 1,576,364 to Russell et al.; U.S. Pat. No. 1,848,265 to Moreau; U.S. Pat. No. 1,872,639 to Licht; U.S. Pat. No. 2,141,806 to Zielesch; U.S. Pat. No. 2,539,881 to Wilkins; U.S. Pat. No. 3,589,117 to Wadsworth; U.S. Pat. No. 3,194,317 to Vautinall are illustrative of such prior art.

Landeis (U.S Pat. No. 5,904,033) discloses a vine cutter system. Landeis particularly teaches a lower cutting disc in engagement with an upper cutting disc for severing vines of potato plants. The cutting discs counter-rotate with respect to one another with the lower cutting disc drawing the vines in between the cutting discs. A problem with this cutting system is that wet and green vines are susceptible to slipping between the upper cutting disc and the lower cutting disc.

Perry (U.S Pat. No. 2,562,387) discloses a power driven vine cutter having a pair of rotary vine cutters distally spaced so as to be positioned between the rows, a corresponding pair of rods to assure against entanglement of heavy vines in the rotary parts, and an engine 19.

Schmidt (U.S Pat. No. 3,126,062) discloses a foliage deflecting unit utilized in combination with a pair of coulters for severing the foliage which upstands between the paths of the coulters impairing the effectiveness of the harvesting mechanism.

While these devices may be suitable for the particular purpose to which they address, they are not as suitable for cutting entangled vines of potato plants in front of a potato harvester so that the vines do not become entangled and accumulated upon a front portion of the potato harvester. None of the prior art discloses an invention which adequately severs the entanglement of the vines of adjacent rows of a crop. The invention disclosed by Perry does not penetrate the ground to sever vines entangled within the ground. Further, the structure of Perry is prone to becoming entangled within the vines because of the nonmoving parts in the frontal portion. The present invention penetrates the ground to sever vines within the ground. Further, the present invention is not prone to clogging or entanglement with the vines because of its dual cutting discs.

In these respects, the vine cutter according to the present invention substantially departs from the conventional concepts and designs of the prior art, and in so doing provides an apparatus primarily developed for the purpose of cutting entangled vines of potato plants in front of a potato harvester so that the vines do not become entangled and accumulated upon a front portion of the potato harvester.

SUMMARY OF THE INVENTION

In view of the foregoing disadvantages inherent in the known types of vine cutters now present in the prior art, the present invention provides a new vine cutter construction wherein the same can be utilized for severing wet and green vines of a potato plant without obstructing the potato harvester.

The general purpose of the present invention, which will be described subsequently in greater detail, is to provide a new vine cutter that has many of the advantages of the vine cutters mentioned heretofore and many novel features that result in a new vine cutter which is not anticipated, rendered obvious, suggested, or even implied by any of the prior art vine cutters, either alone or in any combination thereof.

To attain this, the present invention generally comprises a frame having a pair of upper members and a pair of opposing lower members, a first disc and a second disc journaled to the frame, a third disc journaled to the frame below the first disc and second disc, a ground engaging rim attached coaxially to the third disc, and a motor mechanically connected to the first, second and third discs. The first disc, the second disc and the third disc are vertically orientated, and a portion of the discs overlap and are juxtaposed to one another. A portion of the third disc is between the first disc and the second disc for severing the vines. The discs preferably include a plurality of notches projecting into their respective outer perimeters. The discs may have different sizes with respect to one another. The ground engaging ring attached to the third disc determines the depth of penetration by the third disc into the ground. The discs preferably rotate opposite of one another with a lower portion of the third disc rotating with the movement of the frame with respect to the ground surface. In an alternative embodiment of the present invention, the first disc and the second disc are attached to the frame below the third disc thereby engaging the ground surface.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a vine cutter that will overcome the shortcomings of the prior art devices.

Another object is to provide a vine cutter that quickly and efficiently severs entangled vines surrounding a pair of rows to be harvested.

An additional object is to provide a vine cutter that reduces the amount of sun damaged tubers.

A further object is to provide a vine cutter that severs entangled vines positioned within the ground.

Another object is to provide a vine cutter that is not prone to clogging from entangled vines.

Another object is to provide a vine cutter that maintains its own depth of penetration into the ground surface for severing entangled vines within the ground.

An additional object of the present invention is to provide a vine cutter that severs a vine on opposing sides of a lower cutting disc.

A further object of the present invention is to provide a vine cutter that utilizes two upper cutting discs surrounding a lower cutting disc for severing a vine on opposing sides of the lower cutting disc.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
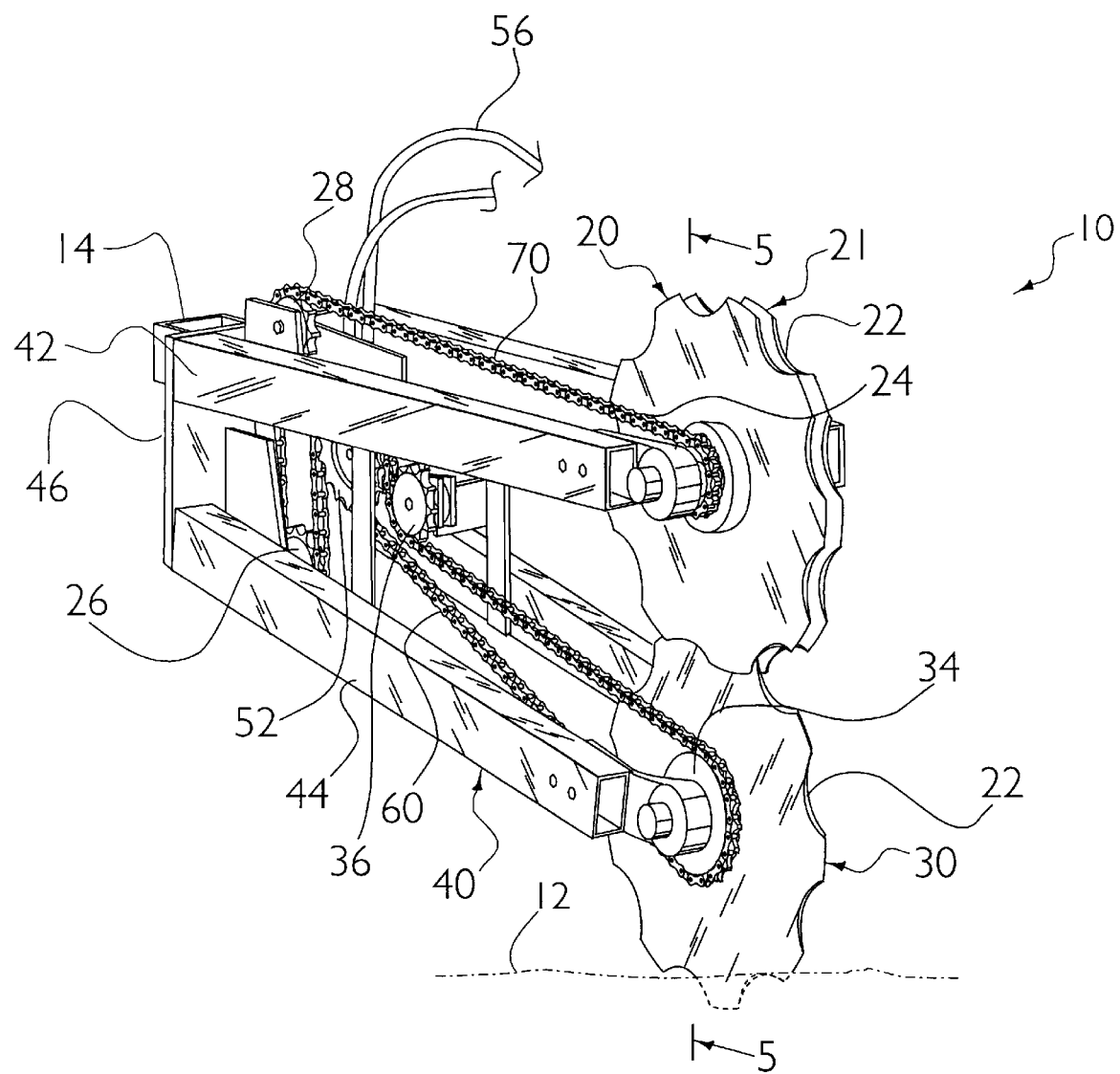
FIG. 1 is a left upper perspective view of the present invention.

Turning now descriptively to the drawings, in which similar reference characters denote similar elements throughout the several view, FIGS. 1 through 6 illustrate a vine cutter 10, which comprises a frame 40 having a pair of upper members 42 and a pair of opposing lower members 44, a first disc 20 and a second disc 21 journaled to the frame 40, a third disc 30 journaled to the frame 40 below the first disc 20 and second disc 21, a ground engaging rim 32 attached coaxially to the third disc 30, and a motor 50 mechanically connected to the first, second and third discs 20, 21, 30. The first disc 20, the second disc 21 and the third disc 30 are vertically orientated, and a portion of the discs 20, 21, 30 overlap and are juxtaposed to one another. A portion of the third disc 30 is between the first disc 20 and the second disc 21 for severing the vines. The discs 20, 21, 30 preferably include a plurality of notches 22 projecting into their respective outer perimeters. The discs 20, 21, 30 may have different sizes with respect to one another. The ground engaging ring 32 attached to the third disc 30 determines the depth of penetration by the third disc 30 into the ground 12. The discs 20, 21, 30 preferably rotate opposite of one another with a lower portion of the third disc 30 rotating with the movement of the frame 40 with respect to the round surface 12. In an alternative embodiment of the present invention, the first disc 20 and the second disc 21 are attached to the frame below the third disc 30 thereby engaging the ground surface 12.

As best shown in FIG. 1 of the drawings, the frame 40 includes a pair of upper members 42 distally spaced parallel to each other. A corresponding pair of lower members 44 are positioned below the pair of upper members 42 forming a rectangular box shape having a front end and a rear end. A rear member 46 is attached to the rear end portion of the pair of upper members 42 and lower members 44. As best illustrated in FIG. 1 of the drawings, the pair of upper members 42 and the pair of lower members 44 project a slight angle away from one another. An attaching means 14 is secured to the rear member 46 for securing the present invention to a frontal side of a potato harvester.

The first disc 20 and the second disc 21 are journaled between the pair of upper members 42 by an upper shaft 25. The discs 20, 21 are vertically orientated parallel to the third disc 30 as best illustrated in FIG. 3 of the drawings.

The first disc 20 and the second disc 21 preferably include a plurality of notches 22 projecting into an outer perimeter of the first disc 20 and the second disc 21 for capturing the vines to be cut. The notches 22 preferably have a concave shape and are spaced along the outer perimeter of the discs 20, 21 at a desired distance.

Figure 3:
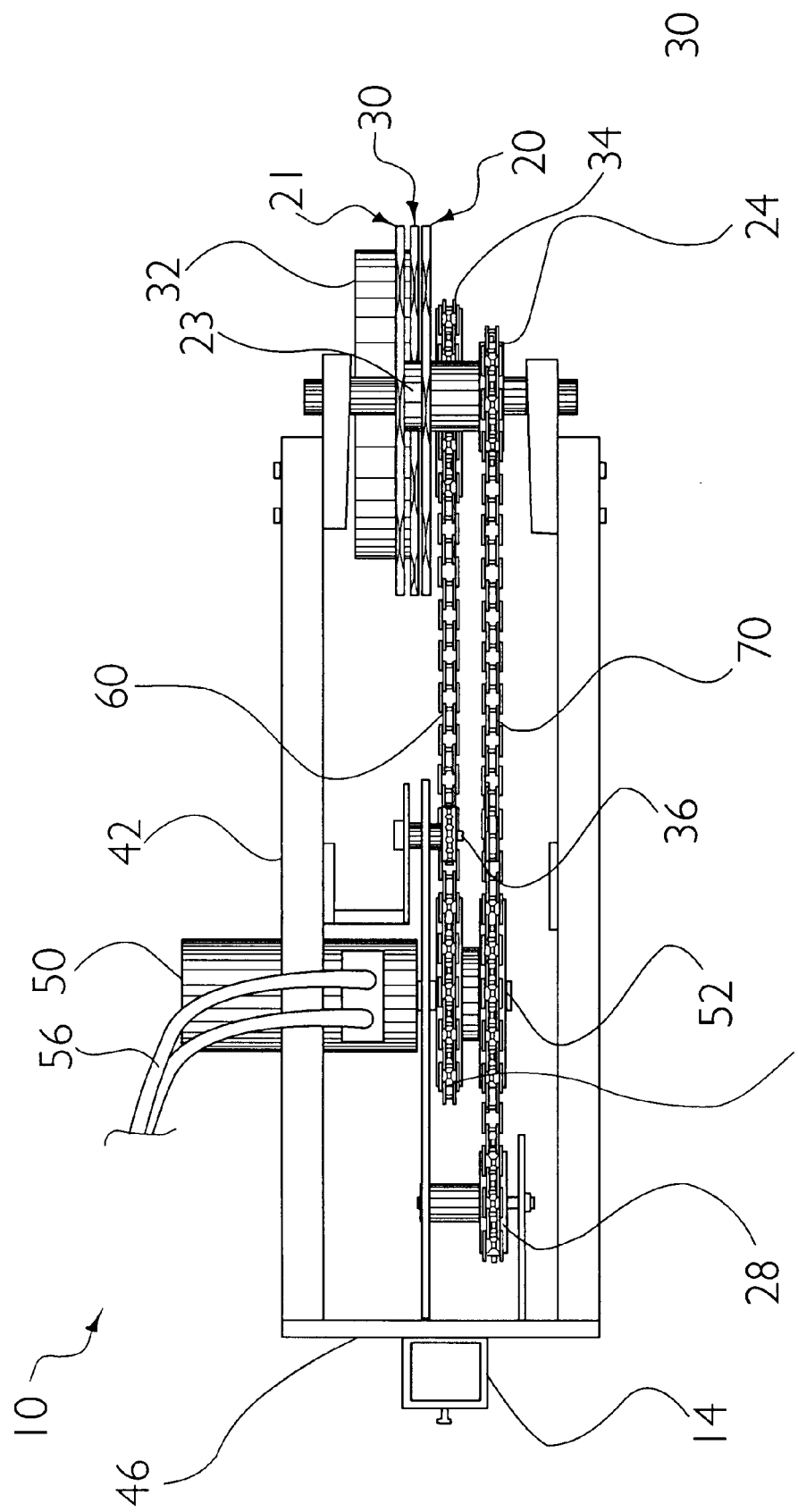
FIG. 3 is a top view of the present invention showing the overlapping of the discs.
Figure 4:
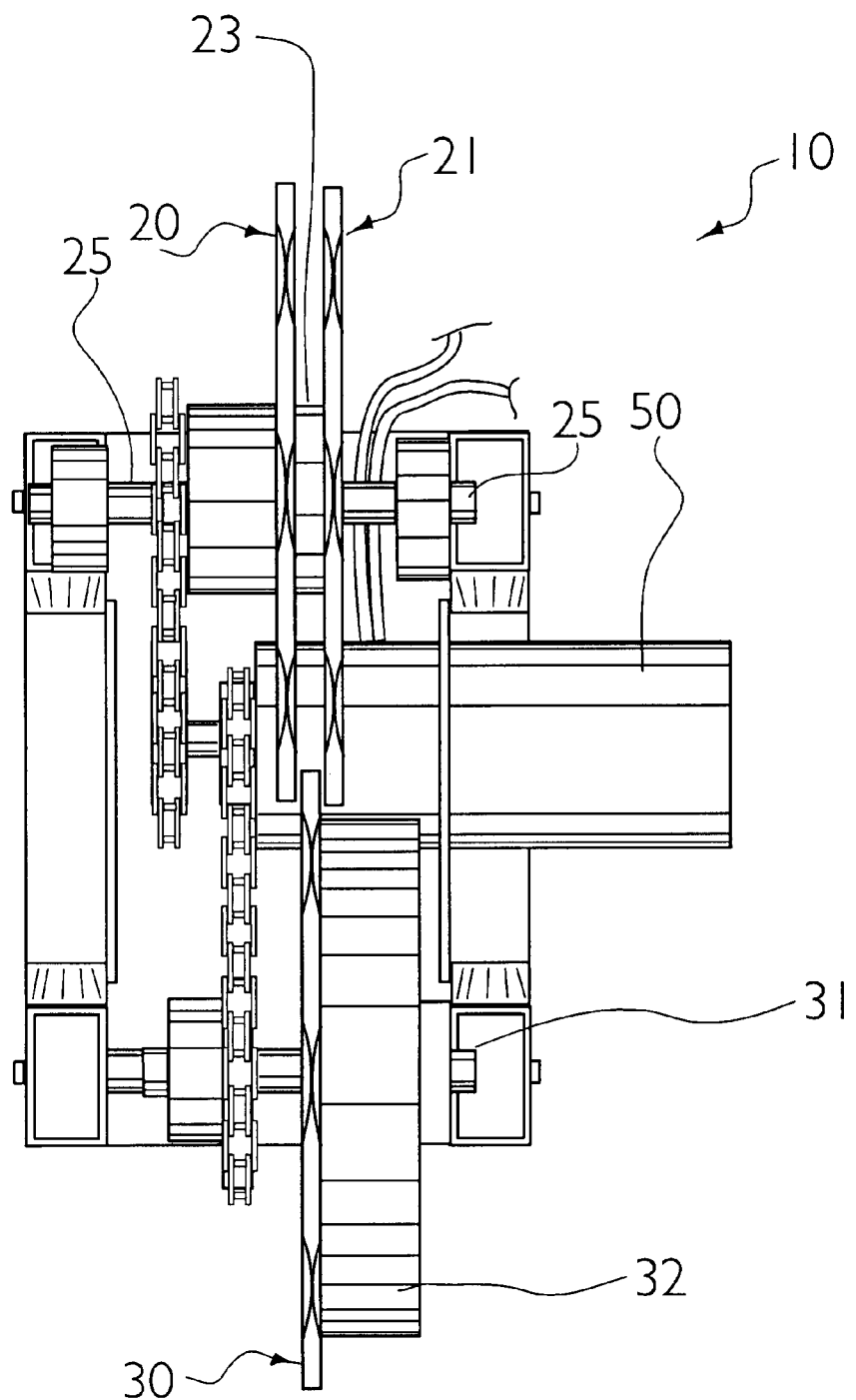
FIG. 4 is a front view of the present invention.
Figure 5:
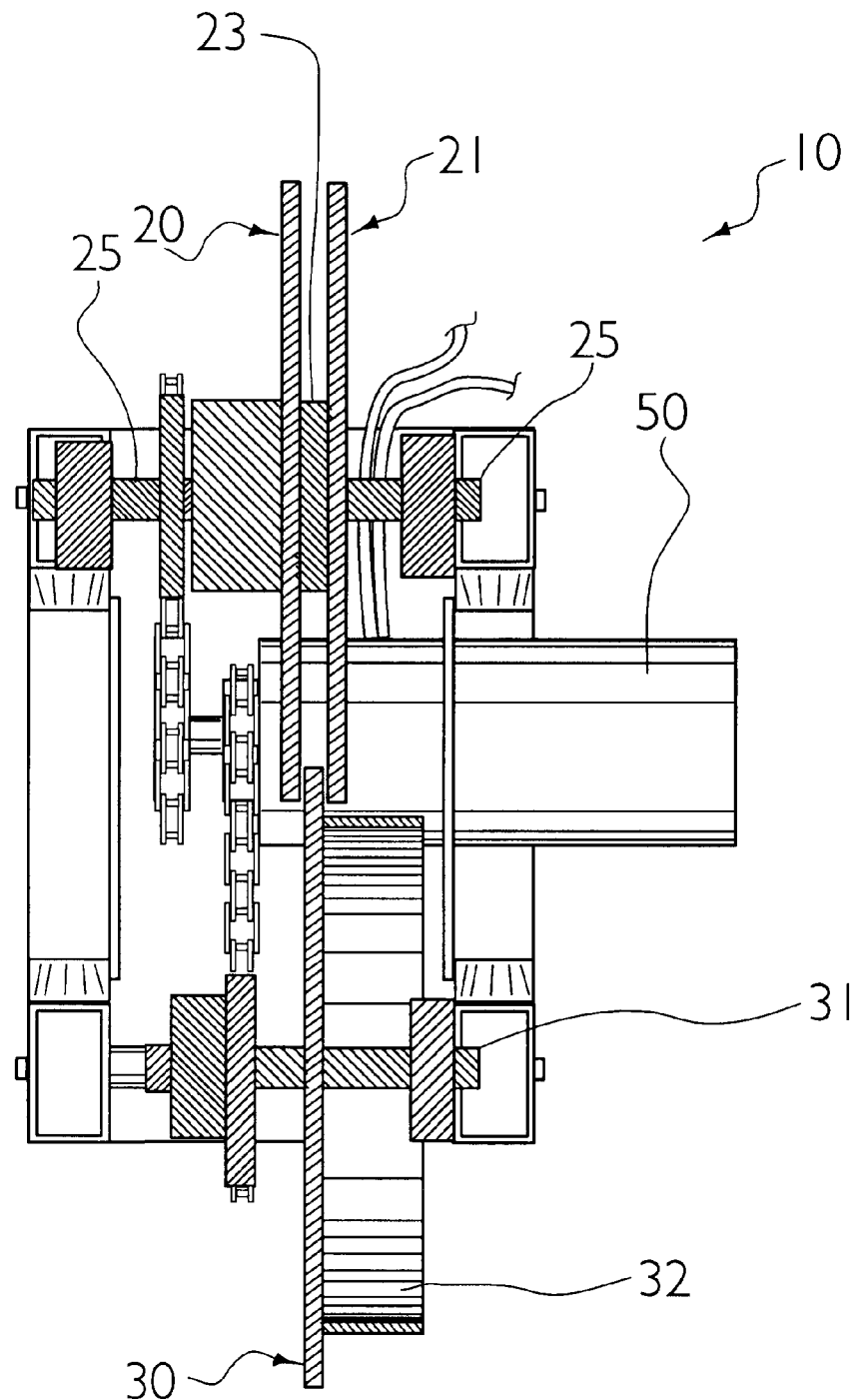
FIG. 5 is a cross sectional view taken along line 5—5 of FIG. 1.

As shown in FIGS. 3 through 5 of the drawings, a spacer 23 is positioned upon the upper shaft 25 between the discs 20, 21 thereby maintaining the discs 20, 21 at the desired distance apart as shown in FIG. 3 of the drawings. The discs 20, 21 are preferably spaced apart a finite distance for receiving the third disc 30 between the discs 20, 21.

The third disc 30 is journaled between the pair of lower members 44 upon a lower shaft 31. The third disc 30 is vertically orientated substantially parallel to the upper discs 20, 21 as best shown in FIG. 4 of the drawings.

Figure 2:
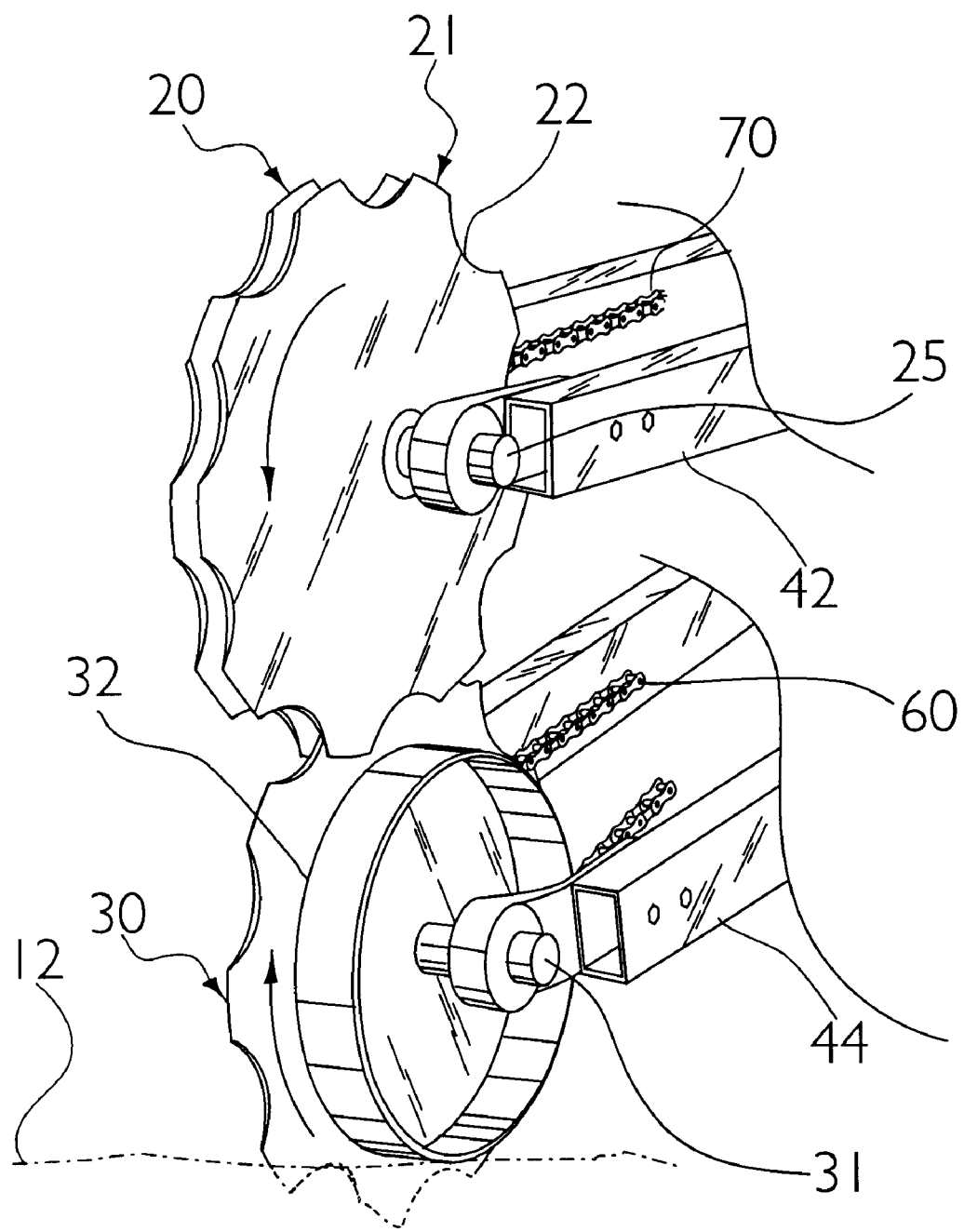
FIG. 2 is a right upper perspective view of the present invention.

As shown in FIG. 5 of the drawings, the third disc 30 preferably includes a rigid ring 32 coaxially attached thereto. The third disc 30 penetrates the ground a predetermined depth as shown in FIGS. 1 and 2 of the drawings. The third disc 30 has an under rotation with the movement of the frame 40. In other words, the third disc 30 rotates so that a lower portion of the third disc 30 rotates with the movement of the frame 40. The ring 32 attached to the third disc 30 determines the depth that the third disc 30 penetrates the ground surface 12. The third disc 30 includes a plurality of notches 22 projecting into an outer perimeter of the third disc 30 for capturing the vines to be cut.

As shown in FIGS. 4 and 5 of the drawings, an upper portion of the third disc 30 overlaps with the upper discs 20, 21 for providing a cutting portion where the vines are severed between the discs 20, 21, 30. The upper discs 20, 21 and the third disc 30 are self-sharpening from rotating juxtaposed to one another. The upper discs 20, 21 preferably frictionally engage a portion of the third disc 30 for preventing the vines from slipping through.

As shown in FIGS. 1, 2 and 5 of the drawings, a motor 50 is mechanically connected to the discs 20, 21 and the third disc 30 by a first chain 60 and a second chain 70 respectively. The motor 50 may either be hydraulic, electric, gas or mechanically powered. The motor 50 is preferably hydraulically driven with a pair of hydraulic hoses 56 extending from the motor 50. The motor 50 has a first drive sprocket 52 and a second drive sprocket 54 coaxially secured to a shaft of the motor 50 as best shown in FIG. 3 of the drawings.

As shown in FIG. 5 of the drawings, the first chain 60 is connected to an upper portion of the first drive sprocket 52. The first chain 60 thereafter engages a lower sprocket 28 and then engages an upper sprocket 26. The first chain 60 then engages the first gear 24 secured coaxially to the first disc 20. The upper sprocket 26 is preferably adjustable to allow the user to adjust the tension in the first chain 60.

As shown in FIG. 5 of the drawings, the second chain 70 is connected to the second drive sprocket 54. The second chain 70 directly engages the second gear 34 attached to the third disc 30 coaxially and opposite of the ring 32 for rotating a lower portion of the third disc 30 in a direction opposite of the movement of the frame 40. A tightening sprocket 36 engages the second chain 70 at its lower perimeter. The tightening sprocket 36 is adjustable for allowing the user to adjust the tension of the second chain 70.

The rotational speed ratio between the discs 20, 21 and the third disc 30 preferably ranges between 1.2 to 2.5. This is adjusted by selecting the appropriate size of first gear 24 and/or second gear 34. The upper discs 20, 21 and the third disc 30 rotate opposite of one another so as to feed the vines into the overlapping area between the pair of discs 20, 21, 30.

Figure 6:
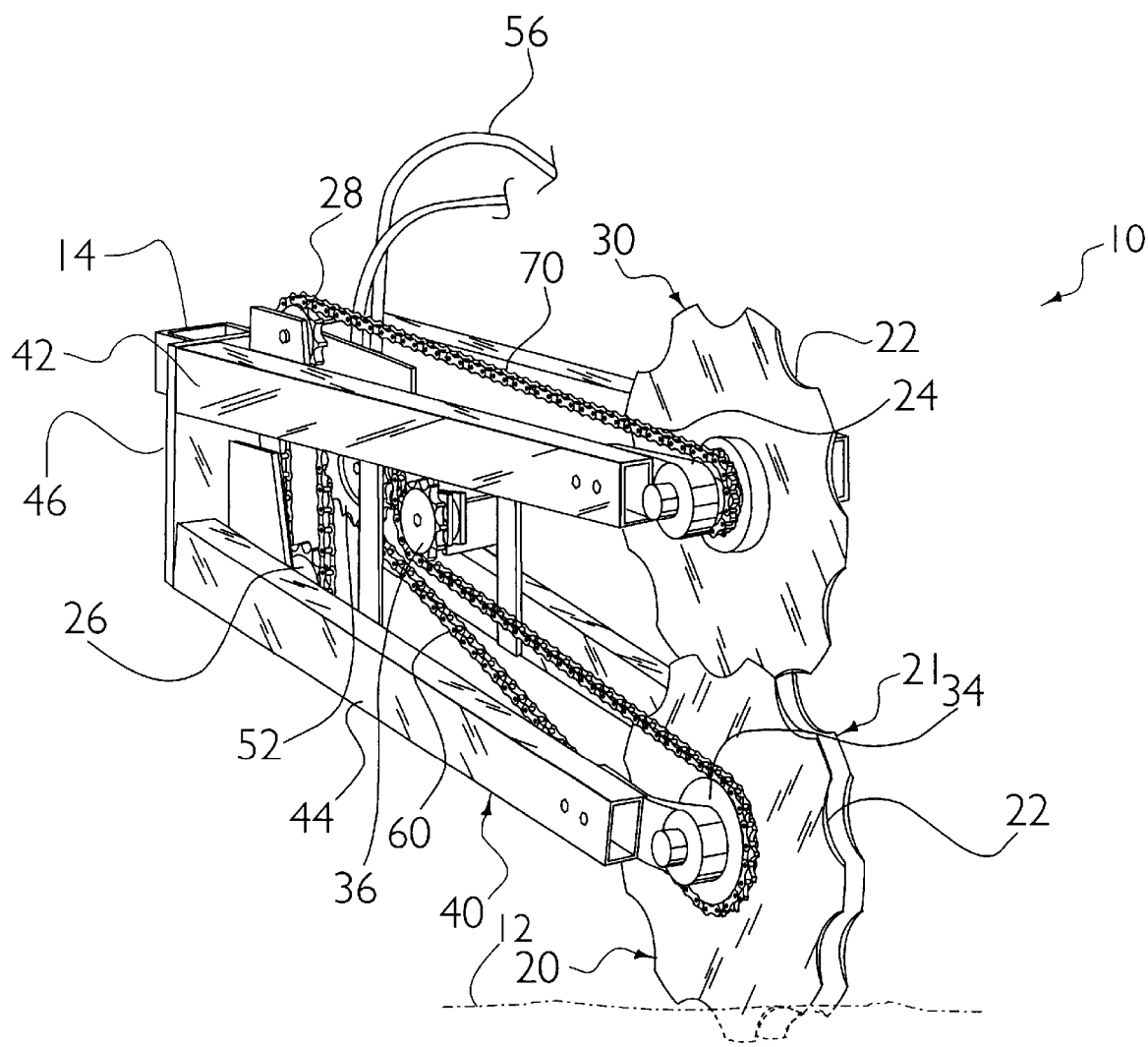
FIG. 6 is an upper perspective view of an alternative embodiment of the present invention showing a pair of lower discs in engagement with an upper disc.

In an alternative embodiment shown in FIG. 6 of the drawings, the first and second discs 20, 21 are journaled to the lower portion of the frame 40 instead of the upper portion thereby allowing the discs 20, 21 to engage the ground surface instead of the third disc 30. As further shown in FIG. 6 of the drawings, the third disc 30 is journaled to the upper portion of the frame 40 and extends between the discs 20, 21 as in the first embodiment. The alternative embodiment provides a more stable grasping of the vines since the vine will be supported on opposing sides by the discs 20, 21 thereby allowing the third disc 30 to sever the vine without significant bending of the vine since the vine will be horizontally tensioned between the discs 20, 21.

In use, the attaching means 14 is fastened to the front side portion of the potato harvester. The invention may also be directly attached to any other implement besides a potato harvester so that the vines may be severed. The motor 50 rotates the discs 20, 21 and the third disc 30 simultaneously and opposite of one another as best shown in FIGS. 1 and 2 of the drawings. An outer portion of the third disc 30 penetrates the ground surface 12 as limited by the support of the rigid ring 32 as best shown in FIGS. 1 and 2 of the drawings. The third disc 30 engages vines that have become entangled within and above the ground a finite distance. This is an important feature of the present invention in that often the vines of the potato plant will grow not only grow on top of the ground surface 12, but will grow below the ground surface 12 where conventional vine cutters are unable to reach. The third disc 30 thereafter guides the entangled vines upwardly toward a portion between the third disc 30 and the upper discs 20, 21 where the discs 20, 21, 30 are juxtaposed to one another. The guided vines are thereafter severed on both sides of the third disc 30 by the upper discs 20, 21. The guided vines are generally captured during severing within the notches 22 of the discs 20, 21, 30 thereby preventing the guided vines from sliding from the discs 20, 21, 30. The digger portion of the potato harvest then may dig the tubers without becoming entangled within the vines of the crop. When the potato harvester is at the end of a row and elevated, the present invention is elevated simultaneously thereby preventing accidental damage to the present invention from leaving the third disc 30 within the ground. It can be appreciated that the alternative embodiment shown in FIG. 6 of the drawings will operate on the same principal.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vine cutter for cutting vines of a crop, comprising:
 a frame having an upper portion and a lower portion;
 a first disc and a second disc journaled to said upper portion of said frame, wherein said first disc is positioned a finite distance from said second disc;
 a third disc journaled to said lower portion of said frame below said first disc and said second disc, wherein a portion of said third disc is positioned between said first disc and said second disc for severing said vines, wherein said third disc is frictionally in engagement between said first disc and said second disc; and
 a means for rotating said first disc, said second disc and said third disc, wherein said third disc rotates opposite of said first disc and said second disc.

2. The vine cutter of claim 1, including a ground engaging ring secured coaxially to said third disc, wherein a radius of said ground engaging ring is shorter than a radius of said third disc for determining said predetermined depth at which said third disc penetrates said ground.

3. The vine cutter of claim 1, wherein said first disc and said second disc include a plurality of notches projecting into an outer perimeter thereof.

4. The vine cutter of claim 1, wherein said third disc includes a plurality of notches projecting into a perimeter thereof.

5. The vine cutter of claim 4, wherein said first disc and said second disc include a plurality of notches projecting into an outer perimeter thereof.

6. The vine cutter of claim 1, wherein a rotational ratio between said third disc and said first disc is between 1.2 and 2.5.

7. The vine cutter of claim 6, wherein said first disc rotates at the same rotational speed of said second disc.

8. The vine cutter of claim 1, wherein said means for rotating comprises a hydraulic motor.

9. The vine cutter of claim 1, wherein said first disc and said second disc have a similar outer perimeter.

10. A vine cutter for cutting vines of a crop, comprising:

a frame having an upper portion and a lower portion;

a first disc and a second disc journaled to said lower portion of said frame, wherein said first disc is positioned a finite distance from said second disc;

a third disc journaled to said upper portion of said frame above said first disc and said second disc, wherein a portion of said third disc is positioned between said first disc and said second disc for severing said vines; and means for rotating said first disc, said second disc and said third disc, wherein said third disc rotates opposite of said first disc and said second disc.

11. The vine cutter of claim 10, including a ground engaging ring secured coaxially to said first disc, wherein a radius of said ground engaging ring is shorter than a radius of said first disc for determining said predetermined depth at which said first disc penetrates said ground.

12. The vine cutter of claim 10, wherein said first disc and said second disc include a plurality of notches projecting into an outer perimeter thereof.

13. The vine cutter of claim 10, wherein said third disc includes a plurality of notches projecting into a perimeter thereof.

14. The vine cutter of claim 13, wherein said first disc and said second disc include a plurality of notches projecting into an outer perimeter thereof.

15. The vine cutter of claim 10, wherein a rotational ratio between said third disc and said first disc is between 1.2 and 2.5.

16. The vine cutter of claim 15, wherein said first disc rotates at the same rotational speed of said second disc.

17. The vine cutter of claim 10, wherein said means for rotating comprises a hydraulic motor.

18. The vine cutter of claim 10, wherein said first disc and said second disc have a similar outer perimeter.

19. The vine cutter of claim 10, wherein said third disc is frictionally in engagement between said first disc and said second disc.

20. A vine cutter for cutting vines of a crop, comprising:

a frame having an upper portion and a lower portion;

a first disc and a second disc journaled to said upper portion of said frame, wherein said first disc is positioned a finite distance from said second disc;

a third disc journaled to said lower portion of said frame below said first disc and said second disc, wherein a portion of said third disc is positioned between said first disc and said second disc for severing said vines;

a means for rotating said first disc, said second disc and said third disc, wherein said third disc rotates opposite of said first disc and said second disc; and wherein a rotational ratio between said third disc and said first disc is between 1.2 and 2.5.

* * * * *